United States Patent [19]
Olney

[11] Patent Number: 6,099,154
[45] Date of Patent: Aug. 8, 2000

[54] MIRROR WITH LIGHTED INDICIA

[75] Inventor: Ross D. Olney, West Hills, Calif.

[73] Assignee: Delco Electronics Corp., Kokomo, Ind.

[21] Appl. No.: 09/178,236

[22] Filed: Oct. 23, 1998

[51] Int. Cl.[7] .................................................. G02B 5/08
[52] U.S. Cl. ......................... 362/494; 498/499; 498/514; 498/516
[58] Field of Search .................................. 362/494, 498, 362/499, 514, 516

[56] References Cited

U.S. PATENT DOCUMENTS

| | | | |
|---|---|---|---|
| 5,481,409 | 1/1996 | Roberts | 359/839 |
| 5,873,604 | 2/1999 | Phillips | 283/70 |
| 5,917,666 | 6/1999 | Kimble | 359/838 |

OTHER PUBLICATIONS

"Visual Warning Indicator Technique for Automotive Mirrors," RD39769, Research Disclosure, May 1997.
"Principles of Optics," Sixth (Corrected) Edition, 1980, pp. 347–351.
Melles Groit 1997–98 Catalog, pp. 196–196–200.

*Primary Examiner*—Cassandra Spyrou
*Assistant Examiner*—Mohammad Sikder
*Attorney, Agent, or Firm*—Jimmy L. Funke

[57] ABSTRACT

In preferred embodiment, a mirror having selectively lightable indicia, including: a substrate of a substantially optically clear material; an optically reflective, optical filter layer disposed on a rear surface of the substrate, the optical filter layer providing at least one relatively narrow bandpass through which light can pass; a plurality of light sources disposed behind the optical filter layer, the plurality of light sources producing light in at least one relatively narrow range of frequencies substantially coincident with the at least one relatively narrow bandpass, such that light from the plurality of light sources can pass through the optical filter and thence through the substrate; and the optical filter layer reflecting, through the substrate, essentially all incident ambient light.

10 Claims, 4 Drawing Sheets

MIRROR WITH LIGHTED INDICIA

BACKGROUND OF THE INVENTION

1. Field of the Invention

The present invention relates to mirrors generally and, more particularly, but not by way of limitation, to a novel mirror having lighted indicia.

2. Background Art

While the present invention is described, for illustrative purposes, as being applied to mirrors used in vehicles, it will be understood that it may be applied as well to any mirror with which it is desired to display lighted indicia.

One or more mirrors are used in virtually every vehicle to permit the operator of the vehicle to observe objects or persons behind or at the side of the vehicle. This is essential for providing the visual warnings necessary for safe operation of the vehicle. For example, using mirrors permits the operator of the vehicle to avoid striking such objects or persons when operating the vehicle in reverse or to avoid striking another vehicle when changing lanes on a roadway. Since the mirrors are frequently viewed by the operator, the mirrors offer convenient areas in which to provide information to the operator in a non-intrusive manner.

With the advent of advanced vehicle systems, such as side and/or rear collision warning systems, providing visual warning symbology in positions other than the standard instrument cluster or the "head up" display is required. For these systems to operate properly, it is vital that the warnings be located in the area that the operator is viewing at the instant the warning is required and generated. For instance, a side collision warning system must produce its visual warning icons and/or text in the side mirror, as it is expected, and encouraged that this is where the operator will be looking during a lane change maneuver. As a safety feature, it is imperative that the visual symbology produced be bright, even under full sunlight conditions, but that the visual symbology show no residual effect when turned off.

Some systems have been developed for providing lighted symbology through a mirror surface; however, some of these suffer from three major technical difficulties based on the half-silvering (or reduced silvering) technique used to allow the symbol light to pass through the mirror surface. First, since the mirror surface is half-silvered, or half-attenuating, in the area of the symbology, half the available light from the light emitting diodes (LEDs) behind the mirror is lost, producing a very weak signal that is not visible under all light conditions, such as direct sunlight striking the mirror surface. Second, and again due to the half-attenuating mirror coating, the symbol can be viewed when the LEDs are not operating, as the mirror surface is not longer fully reflective in this area. Third, the symbology cannot be changed once the mirror is produced.

Another known system uses LEDs behind an ordinary mirror, providing only about one percent transmission over the visible spectral region. The resulting signal is dim and not visible under bright sunlight conditions.

Another known system creates symbology by selectively removing a portion of mirror coating in the shape of the desired symbol and placing LEDs behind the area. The disadvantages of this approach are: (1) the symbols are visible when the LEDs are turned off and (2) once the symbol is created, there is no flexibility for change.

Yet another known system provides multiple layer thin film coatings on the rear surface of the mirror to create a narrow bandpass filter tuned to pass the precise frequency spectrum of light matching that of a chosen LED and reflecting all others. The process and calculations required for tuning the thickness of each layer to produce the desired result are well known. The calculations allow for the production of a bandpass filter in which one may choose both the central frequency and width of the passband. A light reflective mask that is essentially 100 percent attenuating to light is provided and an opening in the shape of a symbol to be displayed is cut in the mask. The mask is mechanically mounted to the coated rear surface of the mirror and LEDs having the chosen spectrum of light are placed behind the opening. This system provides a mirror having a selectively lightable symbol which is viewable in a wide range of light conditions but which is virtually invisible when not lighted. A drawback of this system is that, heretofore, it has been limited to a single color. A further drawback of this system is that it is not possible to selectively change what is displayed, for example, when it is desired to display different text in the same area of the mirror.

Accordingly, it is a principal object of the present invention to provide a mirror having lighted indicia visible in a wide range of ambient light conditions.

It is a further object of the invention to provide such a mirror in which the indicia are invisible or nearly so when the light source is turned off.

It is an additional object of the invention to provide such a mirror in which different indicia may be selectively displayed in a given area or areas of the mirror.

It is another object of the invention to provide such a mirror which can be economically manufactured.

It is yet a further object of the invention to provide such a mirror that has multicolor capability.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in preferred embodiment, a mirror having selectively lightable indicia, comprising: a substrate of a substantially optically clear material; an optically reflective, optical filter layer disposed on a rear surface of said substrate, said optical filter layer providing at least one relatively narrow bandpass through which light can pass; a plurality of light sources disposed behind said optical filter layer, said plurality of light sources producing light in at least one relatively narrow range of frequencies substantially coincident with said at least one relatively narrow bandpass, such that light from said plurality of light sources can pass through said optical filter and thence through said substrate; and said optical filter layer reflecting, through said substrate, essentially all incident ambient light.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
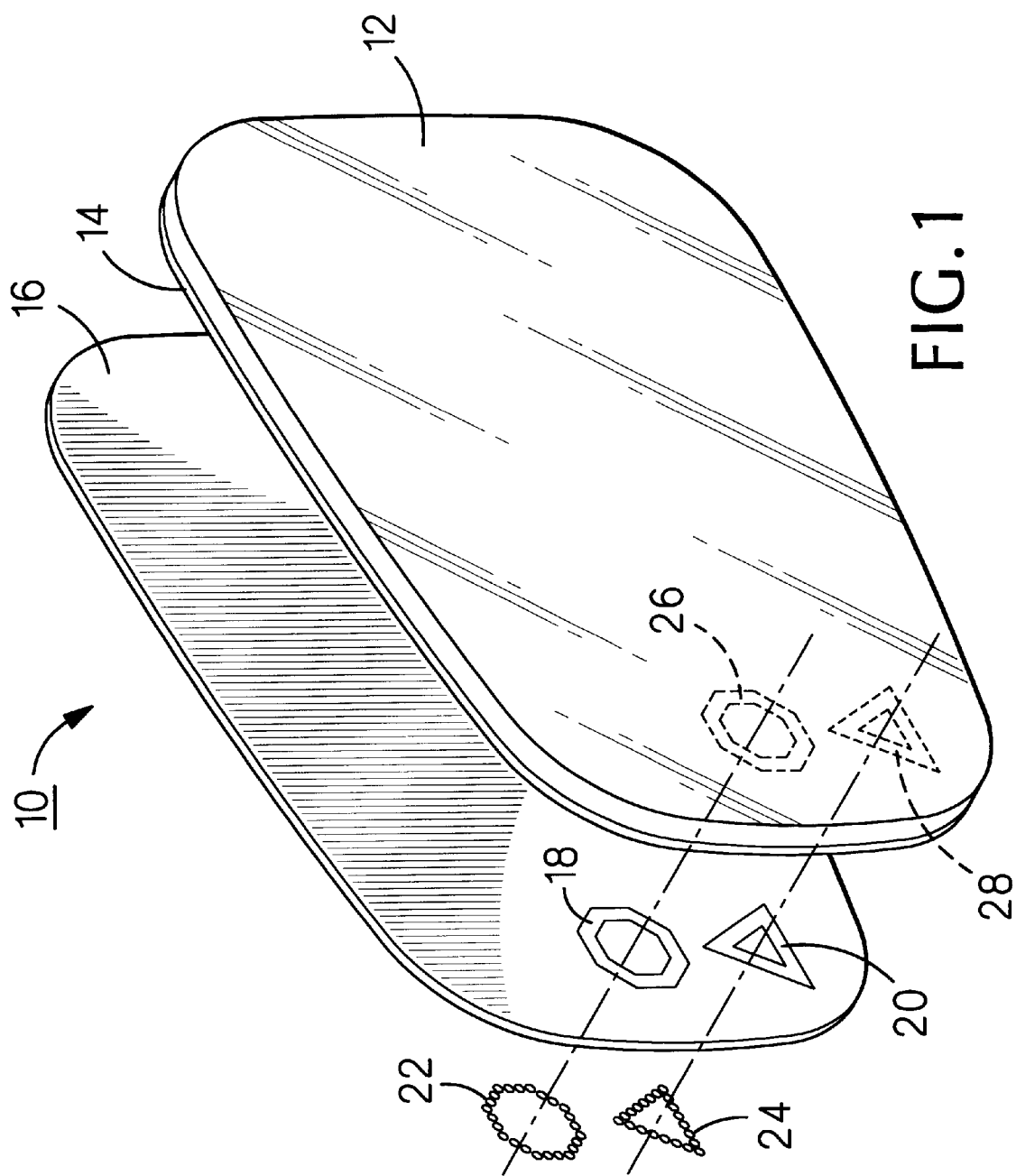
FIG. 1 is an exploded isometric view of a mirror constructed according to one aspect of the present invention.

Reference should now be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

FIG. 1 illustrates a mirror, constructed according to one aspect of the present invention, and generally indicated by the reference numeral 10. Mirror 10 includes a substantially optically clear substrate 12 which may be formed from glass or a clear plastic material, for example. Disposed on the rear surface of substrate 12 are two or more thin film optical filter layers 14 and disposed adjacent the optical filter layers is an opaque mask layer 16 having defined therein a first clear area 18 in the form of a "stop" symbol and a second clear area 20 in the form of a "caution" symbol. Disposed behind mask layer 16 are two pluralities of light sources, as at 22 and 24, the light sources producing, respectively, red and yellow light frequencies. It can be seen that light sources 22 and 24 are aligned, respectively, with first and second clear areas 18 and 20 such that, when the light sources are selectively illuminated, images 26 and 28, respectively, of a red "stop" symbol or a yellow "caution" symbol will appear to a person observing mirror 10, for example an operator of a vehicle on which mirror 10 is mounted.

Since layers 14 reflect nearly 100 percent of all light frequencies, when light sources 22 and 24 are turned off, symbols 18 and 20 will be virtually nonvisible in any ambient light conditions.

Layers 14 can be economically formed from materials commonly employed in multicolor narrow bandpass optical filters, such as titanium dioxide and silicon dioxide, using known techniques. Mask layer 16 and light sources 22 and 24 can be attached to the rear of mirror 10 using suitable conventional mechanical means.

Figure 2A:
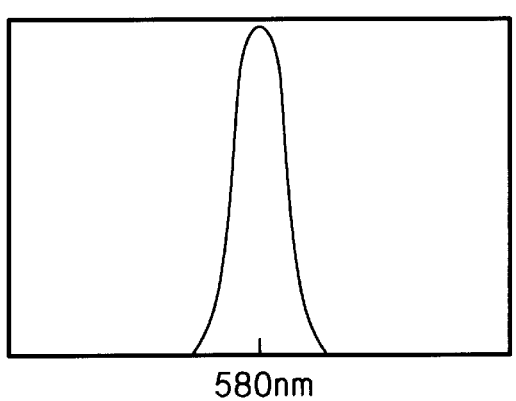
FIGS. 2(A) and 2(B) show the spectral radiance of light sources employed in the mirror of FIG. 1 for two symbols of different colors.
Figure 2B:
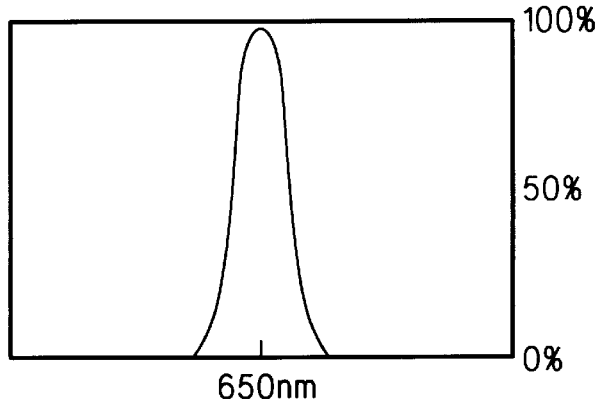

FIG. 2(A) and 2(B) illustrate the spectral radiance produced, respectively, by light sources 24 and 22, with light sources 24 producing light narrowly around 580 nanometers (yellow) and light sources 22 producing light narrowly around 650 nanometers (red).

Figure 2C:
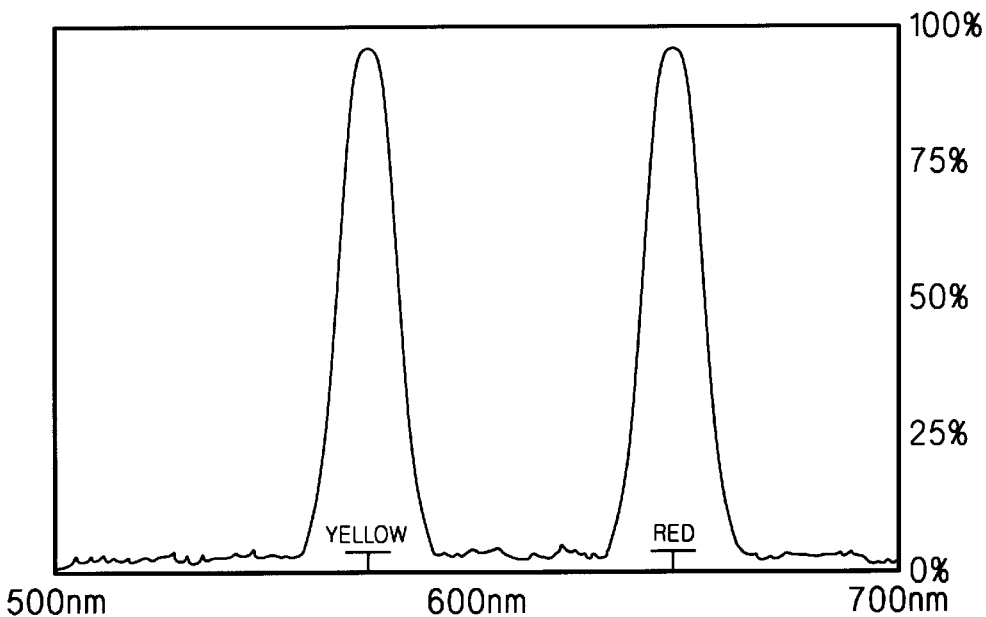
FIG. 2C shows the spectral transmittance of the mirror of FIG. 1.

FIG. 2(C) illustrates the spectral transmittance of light sources 22 and 24, showing that almost all but the desired light frequencies are rejected by filter layers 14 (FIG. 1). Incident ambient light at the desired light frequencies will, of course, pass through filter layers and not be reflected; however, the ranges of those frequencies are so narrow that the absence of those colors from the reflected incident ambient light in limited areas will not be appreciably noticeable, if at all.

It will be understood that the "stop" and "caution" symbols shown are presented for illustrative purposes only and that mask layer 16 may be cut to display other symbols and other indicia such as text. Also, the colors are not limited to red and yellow, but other colors with appropriate reflective optical filters may be chosen. Additionally, any given symbol may have light sources of different colors behind it, so that the symbol may be displayed in one of two or more colors. Further, shaped light sources may be employed to display certain indicia.

Figure 3:
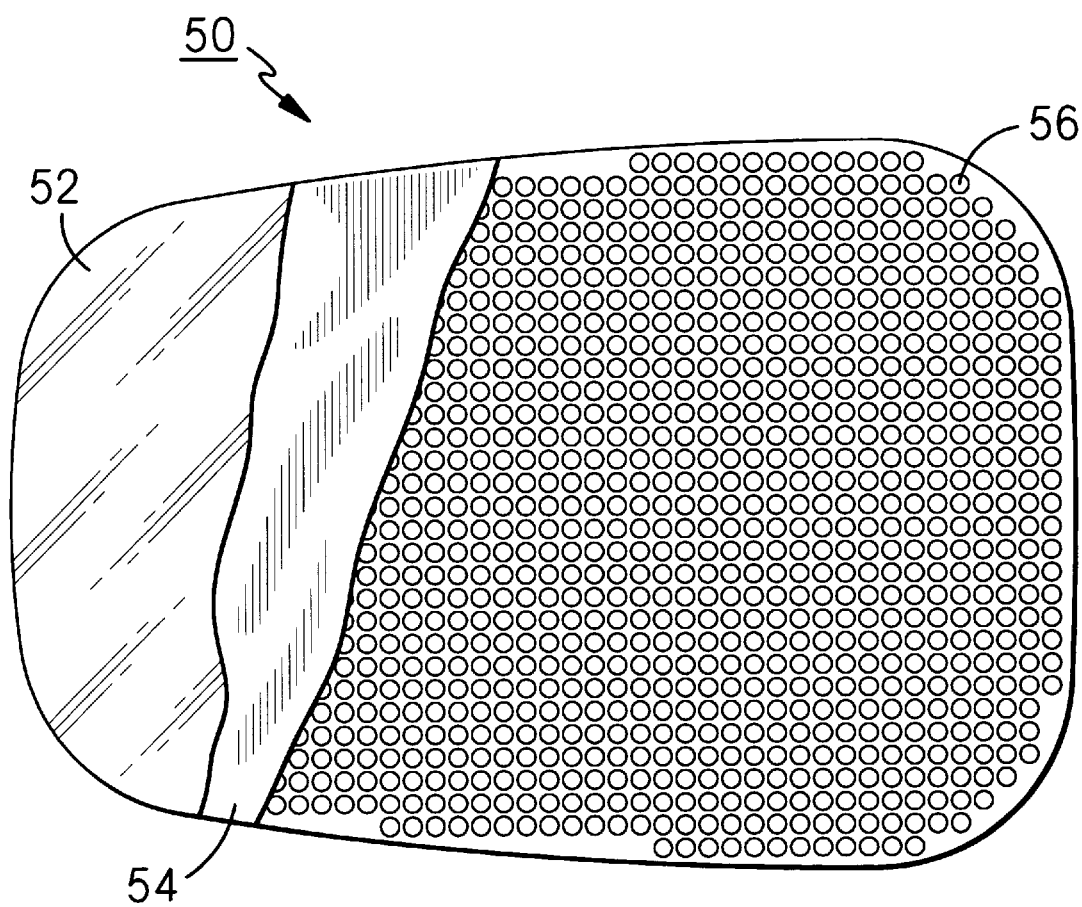
FIG. 3 is a top plan, partially cut-away view of a mirror constructed according to another aspect of the present invention.
Figure 4A:
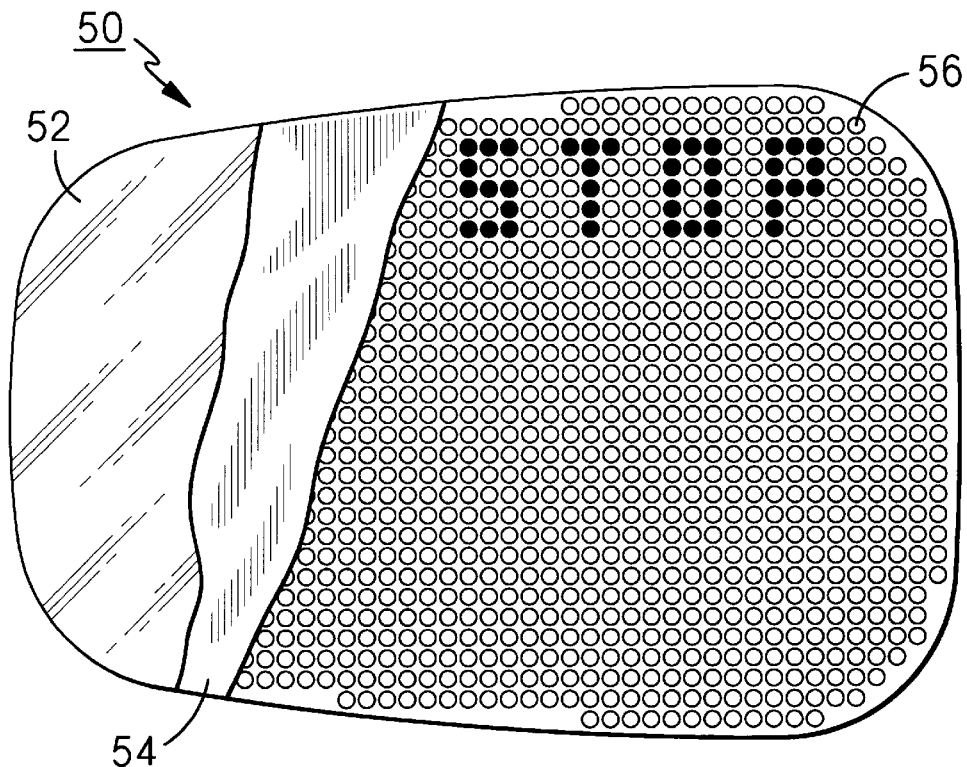
FIGS. 4(A) and 4(B) are top plan, partially cut-away views of the mirror of FIG. 3 with selected lighted indicia displayed.
Figure 4B:
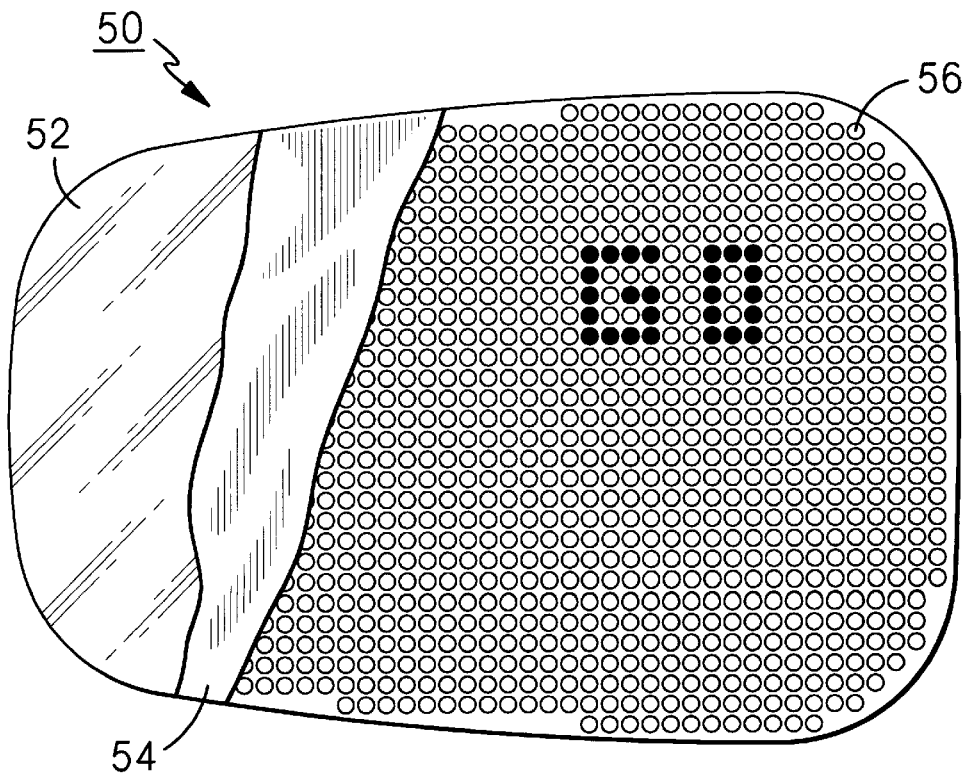

FIG. 3 illustrates a mirror, constructed according to another aspect of the present invention, and generally indicated by the reference numeral 50. Mirror 50 includes a substrate 52, thin film optical filter layers 54, as above (FIG. 1), disposed on a rear surface of the substrate, and a large plurality of light sources, as at 56, disposed behind the optical filter layers. In this embodiment, no mask layer, such as mask layer 16 on mirror 10 (FIG. 1) is provided. In this case, indicia in the form of symbol(s) or text are selectively displayed by turning on certain ones of light sources 56. This is illustrated on FIGS. 4(A) and 4(B) where certain red ones of light sources 56 are turned on to display "SPOP" and certain green ones of the light sources are turned on to display "GO". Of course, the text shown is for illustrative purposes only and additional or other text may be displayed by turning on some of the same or others of light sources 56. A particular advantage of mirror 50 is that what may be selectively displayed can be changed after the mirror is constructed. Additionally, multicolor indicia in the form of symbols and/or text may be displayed simultaneously.

Light sources 56 are preferably either light emitting diodes (LEDs) or elements of a liquid crystal display (LCD). For relatively large features, such as symbols 26 and 28 (FIG. 1), the use of LEDs is satisfactory. Since the edges of LEDs are not well defined, mask layer 16 (FIG. 1) is provided to sharpen the edges. The use of an LCD is more appropriate when text is to be displayed (FIGS. 4(A) and 4(B)) and, in that case, a mask layer is not needed, since the LCD provides sharp edges of the elements of the display. A light source having multicolor capabilities may also be employed.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A mirror having selectively lightable indicia, comprising:
   (a) a substrate of a substantially optically clear material;
   (b) an optically reflective, optical filter layer disposed on a rear surface of said substrate, said optical filter layer providing at least one relatively narrow bandpass of frequencies of light through which only said frequencies of light can pass;

(c) a plurality of light sources disposed behind said optical filter layer, said plurality of light sources producing light in at least one relatively narrow range of frequencies substantially coincident in terms of frequency with said at least one relatively narrow bandpass of frequencies of light, such that light of said frequencies of light from said plurality of light sources can pass through said optical filter and thence through said substrate; and (d) said optical filter layer reflecting, through said substrate, essentially all incident ambient light falling thereon.

2. A mirror, as defined in claim 1, further comprising:

(a) said plurality of light sources selectively producing light in at least two different relatively narrow ranges of frequencies;

(b) said optical filter layer having two relatively narrow bandpass ranges, coincident with said at least two different relatively narrow ranges of frequencies; and (c) a mask layer disposed between said optical filter and said plurality of light sources, said mask layer including therein at least two openings defined therethrough, said at least two openings representing at least two indicia to be displayed to person viewing said mirror, said plurality of light sources being arranged to display said at least two indicia in said at least two different relatively narrow ranges of frequencies.

3. A mirror, as defined in claim 2, wherein: said at least two indicia include a "stop" symbol and a "caution" symbol.

4. A mirror, as defined in claim 2, wherein: said at least two different relatively narrow ranges of frequencies include light in red and yellow optical spectral regions.

5. A mirror, as defined in claim 1, wherein: said light sources comprise LEDs.

6. A mirror, as defined in claim 1, wherein: said light sources comprise elements of an LCD.

7. A mirror, as defined in claim 6, wherein: said LCD is selectively lightable to produce text.

8. A mirror, as defined in claim 1, wherein: said mirror is adapted to be employed in a vehicle.

9. A mirror, as defined in claim 7, wherein: said text is selectable from at least two different items of text.

10. A mirror, as defined in claim 9, wherein: said at least two different items of text are changeable after construction of said mirror.

* * * * *